Patented Oct. 28, 1924.

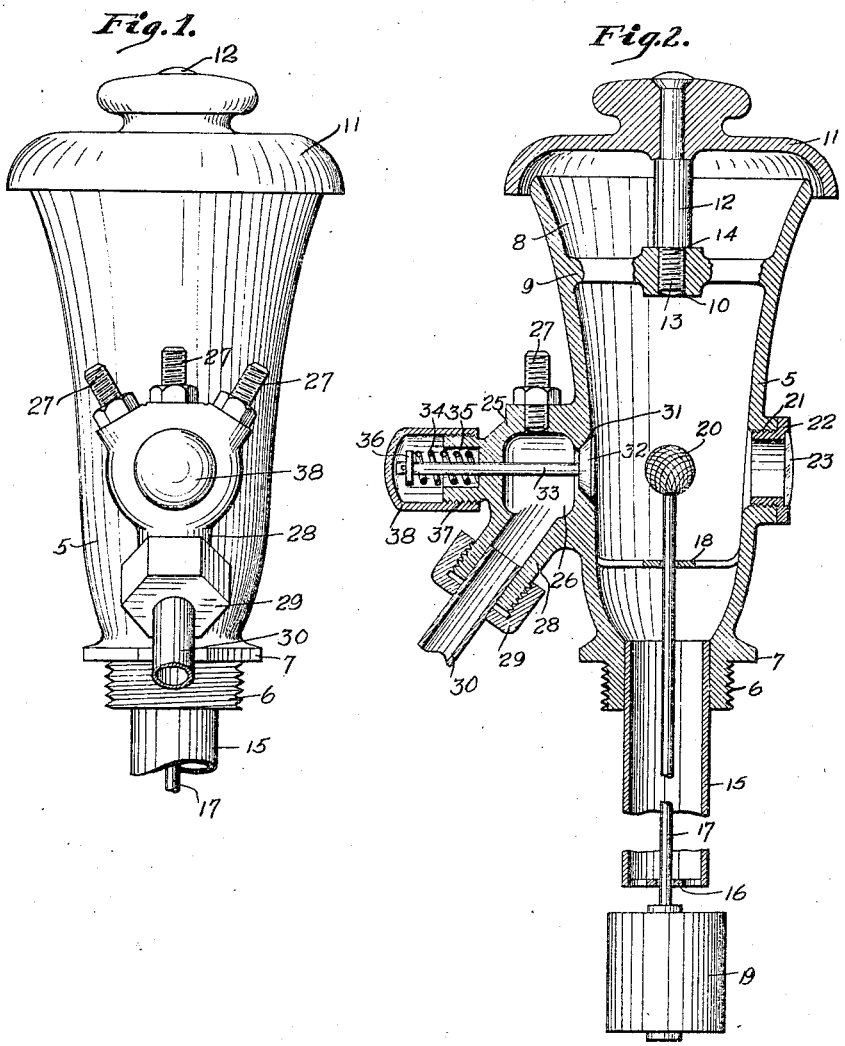

1,512,947

UNITED STATES PATENT OFFICE.

VICTOR W. PAGÉ, OF NEW YORK, N. Y.

BREATHER PIPE.

Application filed March 24, 1921. Serial No. 455,040.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Breather Pipe, of which the following is a full, clear, and exact description.

The present invention relates to new and useful improvements in internal combustion motors, and it pertains more particularly to a new and improved construction of breather pipes therefor.

It is the primary object of the invention to construct a breather pipe so that it has combined therewith several of the elements necessary to the successful operation of an internal combustion motor.

Heretofore it has been the common practire to provide internal combustion motors with a breather pipe which forms the means for introducing oil or lubricant to the crank case. It has also been the practice heretofore to provide a float indicator, a lubricant distributer, and relief for the lubricating system, all of which parts however, have been disposed at various positions about the motor.

It is another object of the invention to combine the various elements mentioned above, i. e., the float gage, the lubricant distributing chamber, and the lubricating system relief, with the breather pipe in order that all of the parts thereof may be readily accessible.

With the above and other objects in view, reference is had to the accompanying drawings, in which—

Figure 1 is a view in side elevation of a breather pipe constructed in accordance with the present invention;

Figure 2 is a longitudinal sectional view thereof taken at right angles to Fig. 1.

Referring more particularly to the drawings, the reference character 5 designates the breather pipe, and said breather pipe is provided with a screw-threaded extremity 6 and a shoulder 7, said screw-threaded extremity forming the means for attaching the breather pipe to the crank case or other suitable part of the motor. The upper portion of the breather pipe 5 is flared outwardly as indicated by the reference character 8, and internally of the breather pipe, near the upper portion, is a brace or the like 9, having a screw-threaded passageway 10. The reference character 11 designates the cover, and said cover is of larger diameter than the upper flared end of the breather pipe 5 and has rigidly secured thereto a pin or the like 12. The lower end of the pin 12 is screw-threaded as indicated by the reference character 13, and is adapted to be received within the screw-threaded passageway 10 to maintain the cover 11 in place, it being understood that the pin 12 is provided with a shoulder 14 to limit the movement of the screw-threaded extension 13 into the internally threaded passageway 10.

Projecting from the lower portion of the breather pipe 5, is a tubular member 15. The bottom of the tubular member 15 is provided with a brace or guide 16, and mounted in said brace or guide 16 is a rod 17, the upper portion of which is engaged in a guide or brace 18 in the lower portion of the breather pipe 5. Mounted upon the lower end of the rod 17, is a float 19, and upon the upper end of the rod 17 is mounted an indicator 20.

The breather pipe is provided in its side with an internally screw-threaded opening 21, and mounted in said opening 21, is a member 22, which carries a glass or the like 23. This construction provides a sight opening in the side of the breather pipe at such a height that when the proper amount of oil is contained in the crank case of the motor, the indicator 20 upon the upper end of the rod 17 will be so positioned as to be visible through the glass 23 of the sight opening.

Formed upon one side of the breather pipe 5 upon the exterior thereof, is a casing 25, and said casing is hollow to provide an internal chamber 26, and leading from the upper portion of the internal chamber 26 is a plurality of nipples 27, which nipples serve the means by which the oil is discharged from the chamber 26 to the several distributing lines of the lubricating system not shown in the present instance. Extending preferably downwardly from the casing 25, is a branch 28, and leading into said branch 28 and secured thereto by means of a nut 29, is an oil supply pipe 30, by means of which the oil is supplied to the chamber 26 by the ordinary circulating pump (not forming a part of the present invention.)

The reference character 31 designates a valve seat formed in the side of the breather pipe 5 adjacent the chamber 26, and adapted for engagement with said seat 31, is a valve 32. This valve has a stem 33 which projects through the chamber 26 to the exterior and has mounted on said projecting end a coil spring 34. This coil spring 34 is mounted in a recess 35, and its outer end engages a washer or the like 36 carried by the stem 33. In order that these parts may be enclosed, the exterior of the recess 35 is screw-threaded as indicated by the reference character 37 to receive and form the retaining means for a cap 38.

The device operates in the following manner:

Owing to the fact that the cover 11 is of greater diameter than the upper flared end of the breather pipe 5, the interior of the motor crank case is open to the atmosphere in order that the breather pipe 5 may function as such. Assuming now that it is desired to introduce oil into the crank case of the motor, the cover 11 is removed and the oil introduced into the flared upper end of the breather pipe 5 from whence it passes through the breather pipe and the tubular member 15 to the interior of the crank case. As the level of oil rises in the crank case, the indicator 20 will be elevated through the medium of the rod 17 and the float 19 until it assumes the position shown in Fig. 2 opposite the sight opening, which will indicate that the proper level of oil in the motor crank case has been attained, after which the cover 11 is returned to position.

By this construction it is apparent that the sight opening may at any time be inspected in order to determine by the position of the indicator 20 relative to the sight opening, whether or not sufficient oil for the successful operation of the motor is contained within the crank case.

Assuming now that the motor is started, the oil-circulating pump is started and a circulation of oil is set up from the crank case of the motor through the pump (not shown), which pump discharges into the pipe 30. By this construction it will be seen that the chamber 26 will be filled with oil and the same will be forced outwardly through the nipples 27 to the various points to be lubricated.

During the operation of the motor if for any reason a pressure should build up in the lubricating system sufficient to overcome the action of the spring 34, it is apparent that this pressure would be relieved at the chamber 26 since the pressure would serve to unseat the valve 32 and permit of a draining of the oil circulating system directly into the breather pipe 5 until such time as the pressure within the oil-circulating system would return to normal.

From the forgoing it is apparent that the present invention provides a combined breather pipe, crank case filler, crank case gage, oil-circulating system and oil-circulating system relief, the several parts of which are mounted at any suitable accessible point on the motor crank case, thus combining these several necessary elements at one point on the motor.

I claim:

1. In combination with a breather pipe having a sight opening in one of its walls, a gage mounted within the breather pipe and adapted to coact with said sight opening, as and for the purpose set forth.

2. In combination, a breather pipe comprising a body portion, a tubular discharge member secured to said body portion, a gage mounted internally of said breather pipe, and means for supporting said gage and operating the same, said means being slidably mounted in the tubular discharge member.

3. In a breather pipe, a body portion, an oil-distributing chamber formed on the body portion on the exterior thereof, and a relief valve carried by said oil-distributing chamber and adapted to discharge a portion of the contents of the oil-distributing chamber directly into the breather pipe, as and for the purpose set forth.

4. In combination with a breather pipe, an oil-distributing chamber formed on the exterior of said breather pipe, said breather pipe having a passageway for establishing communication between the oil-distributing chamber and the interior of the breather pipe, and a spring-actuated valve adapted to control the passage between the oil-distributing chamber and the breather pipe, as and for the purpose set forth.

5. A breather pipe for motors comprising in combination a hollow body portion having an open end and a sight opening, means for closing the open end of the breather pipe, a gage, a rod projecting from said gage, said rod and gage being mounted internally of the breather pipe, a float carried by the lower end of said rod and exterior of the breather pipe, said float being adapted to move the gage relatively to the sight opening, whereby the level of oil in the motor crank case may be ascertained by a reading of the gage relative to the sight opening.

6. In combination with a breather pipe and the oil-distributing system of an internal combustion motor, a seat formed in one of the walls of the breather pipe, a relief valve for relieving the pressure in the oil-distributing system, said relief valve coacting with said seat in such a manner as to permit a discharge of oil from the circulating system directly to the interior of the breather pipe.

7. In combination with an internal combustion motor and its oil-circulating system, a breather pipe and filling pipe, comprising means by which the oil is introduced into the crank case of the motor, a circulating chamber formed upon the exterior of the breather and filling pipe, said chamber forming a portion of the oil-circulating system, and means for permitting a discharge of oil from said chamber to the interior of the breather pipe for reducing the pressure in the oil-circulating system.

8. In combination with an internal combustion motor and its oil-circulating system, a breather pipe and filling pipe, comprising means by which the oil is introduced into the crank case of the motor, a circulating chamber formed upon the exterior of the breather pipe and filling pipe, said chamber forming a portion of the oil-circulating system, and means for automatically permitting a discharge of oil from said chamber to the interior of the breather pipe for reducing the pressure in the oil-circulating system.

9. In combination with an internal combustion motor and its oil-circulating system, a combined breather and filling pipe, a distributing chamber formed on the exterior of said breather and filling pipe, a valve seat formed in the wall of the breather and filling pipe, said valve seat terminating in a passage leading to the distributing chamber, and a spring-actuated valve adapted to coact with said valve seat to permit said spring-actuated valve being adapted to disengage the valve seat to permit a discharge of oil from the distributing chamber to the interior of the breather pipe to relieve the pressure in the oil-circulating system.

VICTOR W. PAGÉ.